US012008399B2

(12) United States Patent
Zhu et al.

(10) Patent No.: US 12,008,399 B2
(45) Date of Patent: Jun. 11, 2024

(54) OPTIMIZATION FOR SCHEDULING OF BATCH JOBS

(71) Applicant: International Business Machines Corporation, Armonk, NY (US)

(72) Inventors: Xi Bo Zhu, Beijing (CN); Shi Yu Wang, Beijing (CN); Xiao Xiao Pei, Beijing (CN); Qin Li, Shanghai (CN); Lu Zhao, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 360 days.

(21) Appl. No.: 17/121,934

(22) Filed: Dec. 15, 2020

(65) Prior Publication Data

US 2022/0188148 A1  Jun. 16, 2022

(51) Int. Cl.
*G06F 9/48* (2006.01)

(52) U.S. Cl.
CPC ...... *G06F 9/4881* (2013.01); *G06F 2209/484* (2013.01)

(58) Field of Classification Search
CPC .......................... G06F 9/4881; G06F 2209/484
See application file for complete search history.

(56) References Cited

U.S. PATENT DOCUMENTS

| | | | |
|---|---|---|---|
| 6,805,502 B2 | 10/2004 | Rai et al. | |
| 7,168,064 B2 | 1/2007 | Ousterhout et al. | |
| 8,572,616 B2 | 10/2013 | Cai et al. | |
| 2005/0198636 A1 | 9/2005 | Barsness et al. | |
| 2006/0095914 A1 | 5/2006 | Mankovski | |
| 2011/0107341 A1* | 5/2011 | Longobardi | G06F 9/5033 718/102 |
| 2013/0139164 A1* | 5/2013 | Balko | G06Q 10/06 718/102 |
| 2014/0298343 A1* | 10/2014 | Rajan | G06F 9/5027 718/102 |

(Continued)

FOREIGN PATENT DOCUMENTS

EP  3506094 A1  7/2019

OTHER PUBLICATIONS

International Search Report and Written Opinion for Application GB202117268, Jun. 24, 2022, 9 pages.

(Continued)

*Primary Examiner* — Wissam Rashid
(74) *Attorney, Agent, or Firm* — Jeffrey M. Ingalls

(57) ABSTRACT

A method, system and computer program product for optimizing scheduling of batch jobs are disclosed. The method may include obtaining, by one or more processors, a set of batch jobs, connection relationships among batch jobs in the set of batch jobs, and a respective execution time of each batch job in the set of batch jobs. The method may also include generating, by the one or more processors, a directed weighted graph for the set of batch jobs, wherein in the directed weighted graph, a node represents a batch job, a directed edge between two nodes represents a directed connection between two corresponding batch jobs, a weight of a node represents the execution time of the batch job corresponding to the node. The method may also include obtaining, by one or more processors, information of consumption of same resource(s) among the batch jobs in the set of batch jobs.

15 Claims, 14 Drawing Sheets

(56) References Cited

U.S. PATENT DOCUMENTS

| | | | |
|---|---|---|---|
| 2014/0344813 | A1 | 11/2014 | Jamjoom |
| 2017/0109217 | A1 | 4/2017 | Raman et al. |
| 2017/0371709 | A1* | 12/2017 | Harper .................... G06F 9/505 |
| 2018/0276040 | A1* | 9/2018 | Hosmani ............. G06F 16/9024 |

OTHER PUBLICATIONS

Shmueli et al., "Backfilling with Lookahead to Optimize the Performance of Parallel Job Scheduling," 2003, pp. 228-251.
Agrawal et al., "Batch systems: Optimal scheduling and processor optimization", Indian Institute of Technology Hyderabad, Hyderabad, India, printed Oct. 6, 2020, 5 pages.
Gandhi et al., "Improved Bounds for Scheduling Conflicting Jobs with Minsum Criteria", ACM Transactions on Algorithms, vol. 4, No. 1, Article 11, Publication date: Mar. 2008, 20 pages.
"Automatic Conflict Resolver Tool—ACRT", An IP.com Prior Art Database Technical Disclosure, IP.com No. IPCOM000245343D, IP.com Electronic Publication Date: Mar. 2, 2016, 8 pages.
Mell et al., "The NIST Definition of Cloud Computing", Recommendations of the National Institute of Standards and Technology, Special Publication 800-145, Sep. 2011, 7 pages.

* cited by examiner

OPTIMIZATION FOR SCHEDULING OF BATCH JOBS

BACKGROUND

The present disclosure relates to batch jobs processing, and more specifically, to methods, systems and computer program products for optimizing scheduling of batch jobs.

Batch jobs can be used to perform various tasks, such as a general company internal process, an E-business on-line process, and the like. Usually, batch jobs are performed regularly (for example every day or every week, etc.) and the order of each batch job (i.e. scheduling) is managed by a batch scheduler.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

According to a first aspect of the present disclosure, there is provided a computer-implemented method for optimizing scheduling of batch jobs. The method may include obtaining, by one or more processors, a set of batch jobs, connection relationships among batch jobs in the set of batch jobs, and a respective execution time of each batch job in the set of batch jobs. The method may also include generating, by the one or more processors, a directed weighted graph for the set of batch jobs, wherein in the directed weighted graph, a node represents a batch job, a directed edge between two nodes represents a directed connection between two corresponding batch jobs, a weight of a node represents the execution time of the batch job corresponding to the node. The method may also include obtaining, by one or more processors, information of consumption of same resource(s) among the batch jobs in the set of batch jobs. The method may also include optimizing, by the one or more processors, the directed weighted graph based on the information of consumption of same resource(s) among the batch jobs in the set of batch jobs.

According to a second aspect of the present disclosure, there is provided a system. The system comprises a processing unit and a memory coupled to the processing unit and storing instructions thereon. The instructions, when executed by the processing unit, perform actions of the above method.

According to a third aspect of the present disclosure, there is provided a computer program product comprising a computer-readable storage medium having program instructions embodied therewith. The program instructions are executable by a processor to cause the processor to perform actions of the above method.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, explain the principles of the disclosure. The drawings are only illustrative of certain embodiments and do not limit the disclosure.

Through the more detailed description of some embodiments of the present disclosure in the accompanying drawings, the above and other objects, features and advantages of the present disclosure will become more apparent, wherein the same reference generally refers to the same components in the embodiments of the present disclosure. The various features of the drawings are not to scale as the illustrations are for clarity in facilitating one skilled in the art in understanding the disclosure in conjunction with the detailed description. The drawings are discussed forthwith below.

DETAILED DESCRIPTION

Figure 1:
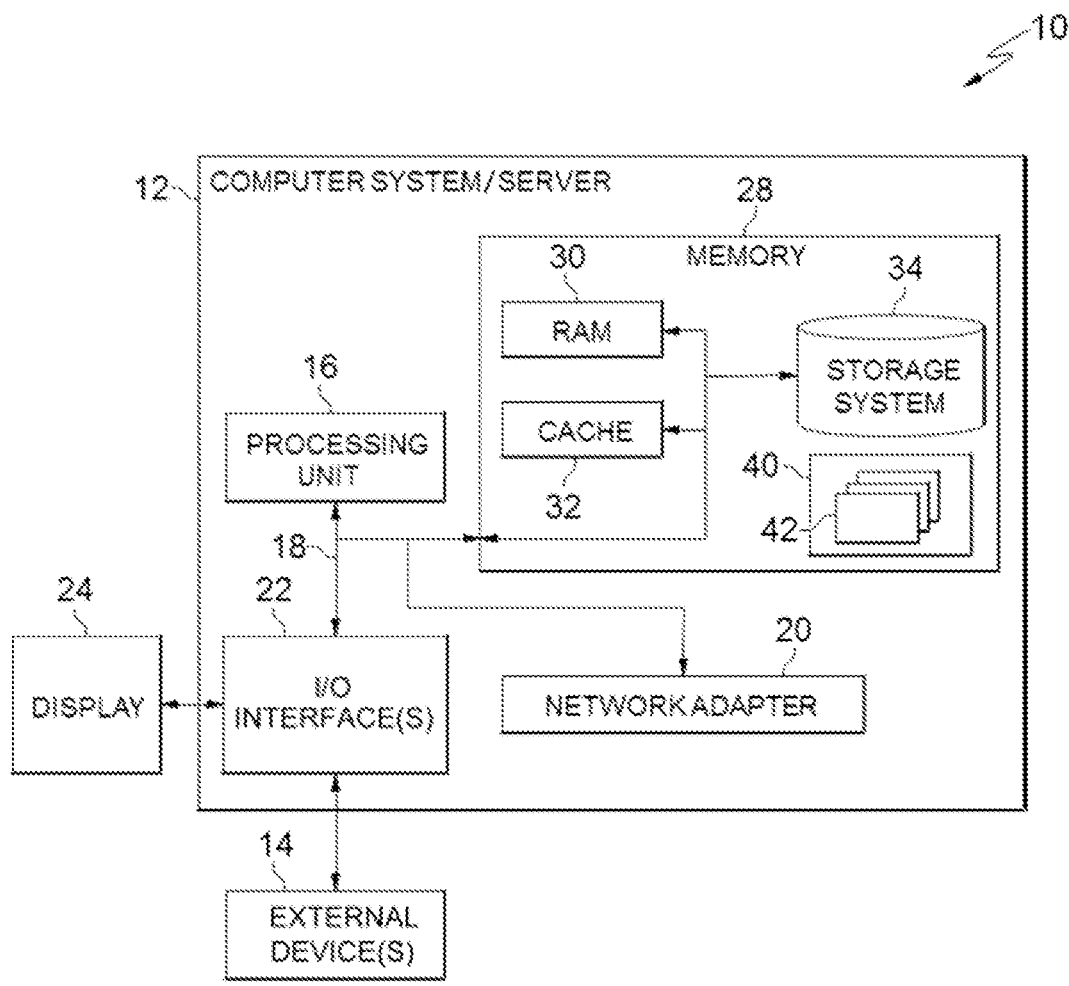
FIG. 1 depicts a cloud computing node according to some embodiments of the present disclosure.

Embodiments of the present disclosure will now be described in detail with reference to the accompanying Figures.

The following description with reference to the accompanying drawings is provided to assist in a comprehensive understanding of exemplary embodiments as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used to enable a clear and consistent understanding of the embodiments. Accordingly, it should be apparent to those skilled in the art that the following description of exemplary embodiments is provided for illustration purpose only and not for the purpose of limiting the embodiments as defined by the appended claims and their equivalents.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the disclosure described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to the one or more processors or processing units 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the disclosure as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
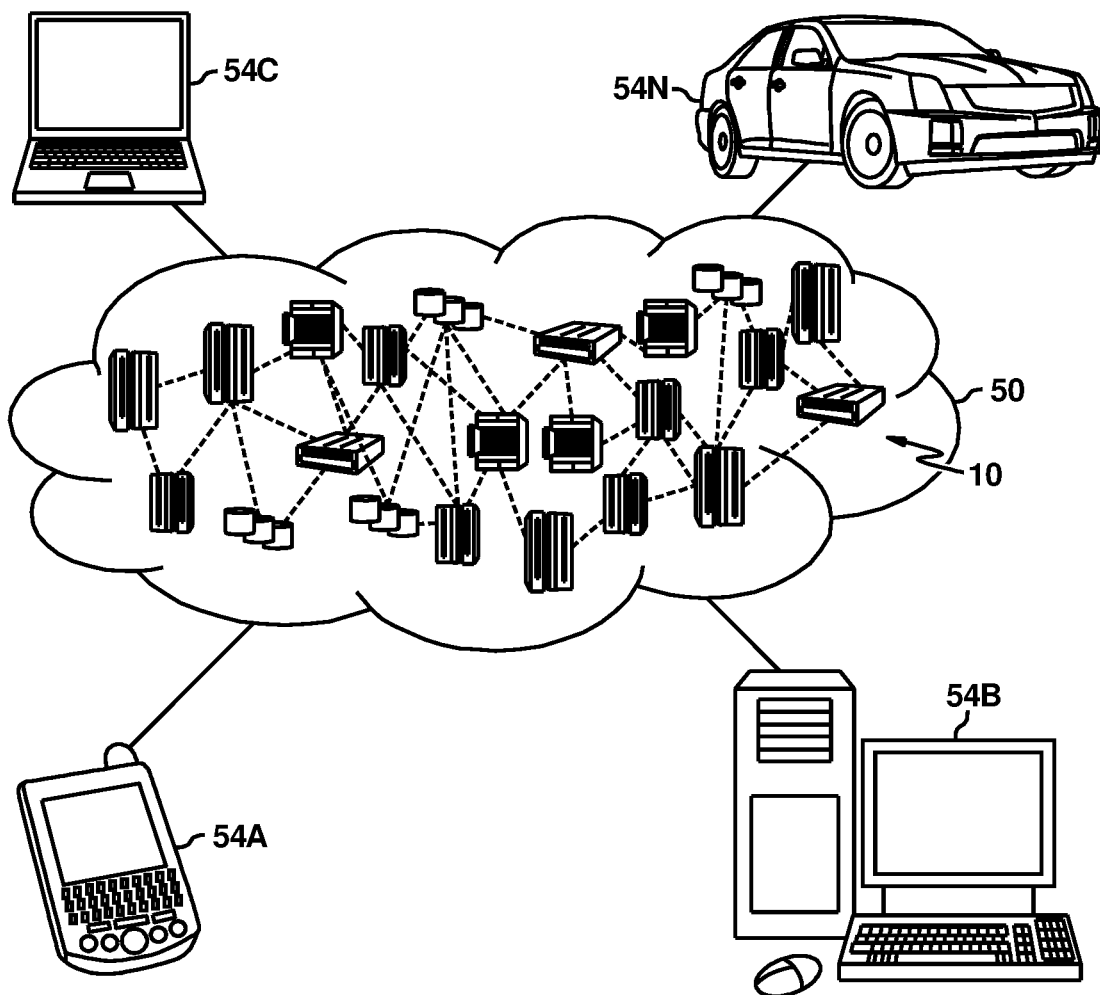
FIG. 2 depicts a cloud computing environment according to some embodiments of the present disclosure.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
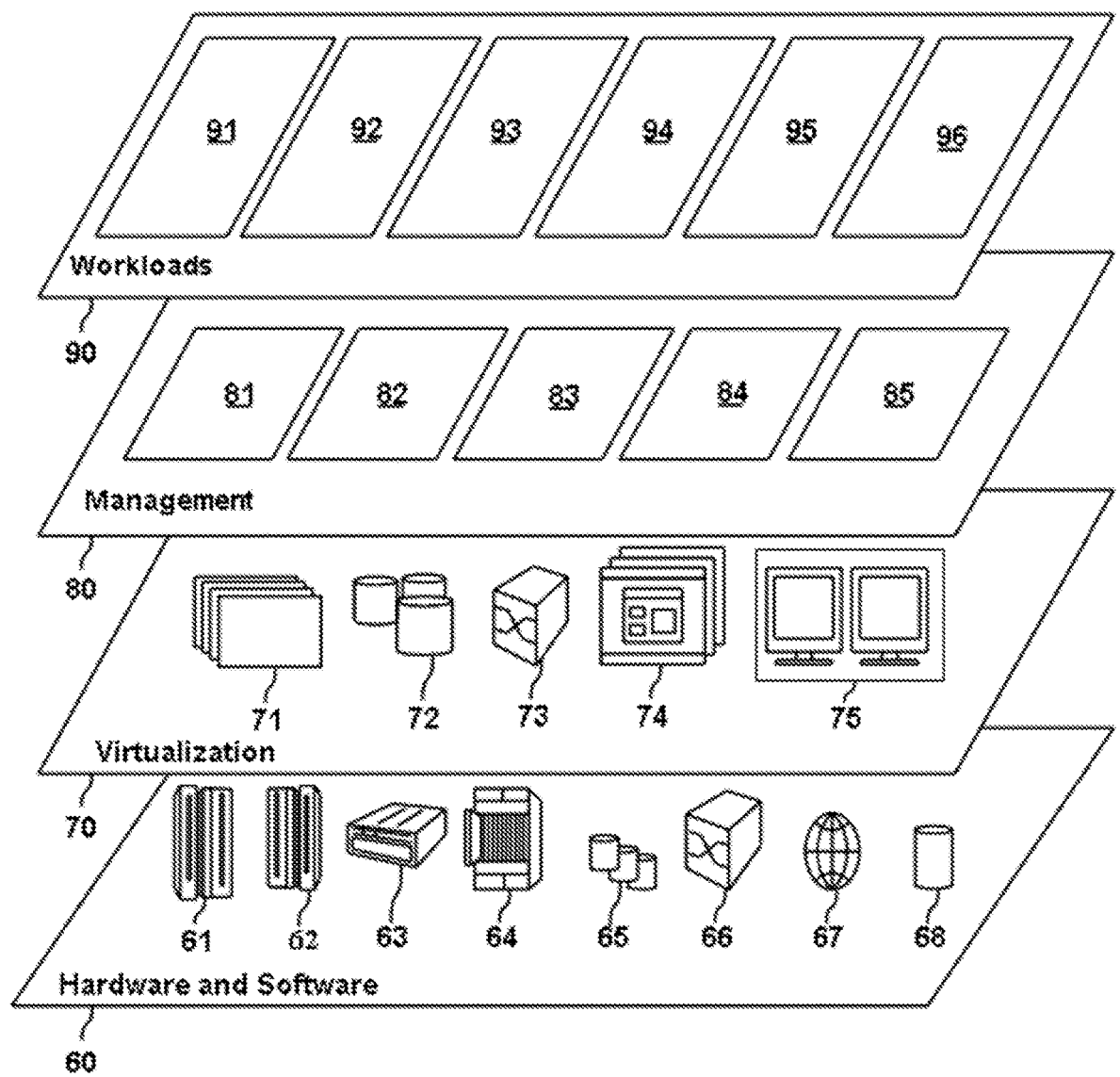
FIG. 3 depicts abstraction model layers according to some embodiments of the present disclosure.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and optimizing scheduling of batch jobs 96.

As mentioned above, batch jobs are used to perform a task and the scheduling of batch jobs is managed by a batch scheduler. A banking business is an example of a business. During the daytime when a bank is open for business, online transaction processing (OLTP) is the main business. Online transactions come from different channels, including tellers, e-banking, automatic teller machines (ATMs), and so on. At night, the bank often selects a certain period of time, for example: 10 μm to 5 am (named as total batch window), and centralizes batch operations periodically for end-of-day processing for data integration, mainly batch accounting processing, such as batch withholding, issuing, deposit and loan interest settlement, clearing and reconciliation, third-party reconciliation files, data platform data processing, general ledger account reconciliation, statements, general ledger account reconciliation, statements, and the like. The execution of these batch jobs is usually carried out in stages according to different business departments, such as: a personal business department, a corporate business department, a credit card business department, a customer information business department, and so on.

Figure 4:
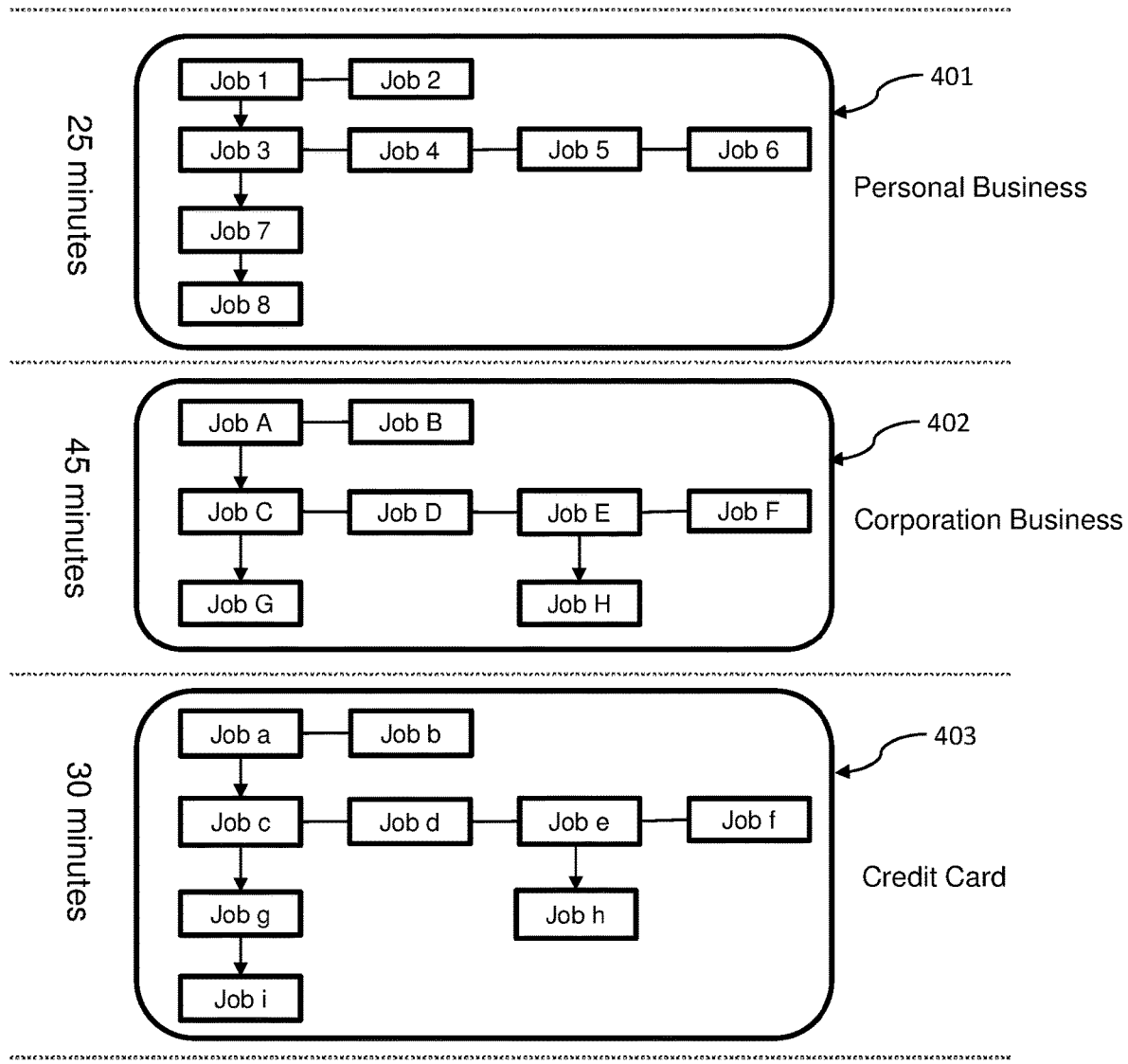
FIG. 4 depicts three exemplary sets of batch jobs executed by three business departments in a bank.

FIG. 4 depicts three exemplary sets of batch jobs executed by three business departments in a bank. Set 401 of batch jobs is executed by the personal business department within a first batch window (for example, the duration is 25 minutes). Set 402 of batch jobs is executed by the corporation business department within a second batch window (for example, the duration is 45 minutes). Set 403 of batch jobs is executed by the credit card business department within a third batch window (for example, the duration is 30 minutes).

Within a business department, the batch processing is refined into different batch jobs. For example, referring to FIG. 4, Set 401 of batch jobs comprises the following batch jobs: agency issuance (Job 1), interest rate settlement (Job 2), form update (Job 3), withholding (Job 4), clearing and reconciliation (Job 5), third-party (Job 6), general ledger reconciliation (Job 7), and statements (Job 8); Set 402 of batch jobs comprises the following batch jobs: withholding (Job A), collection (Job B), summary (Job C), reconciliation (Job D), form update (Job E), clearing (Job F), report (Job G) and third party (Job H); and Set 403 of batch jobs comprises the following batch jobs: fee collection (Job a), reconciliation (Job b), points (Job c), third party (Job d), refund and repayment (Job e), account update (Job f), automatic repayment (Job g), bill generation (Job h) and rights update (Job i). Further, the scheduling for batch jobs is performed according to business logic. These batch jobs may be executed in a certain order to conform to precedence rules. The interrelationship between the different batch jobs (e.g. some batch jobs require input data generated or output by other batch jobs before execution in order to implement the batch job treatment) makes these different jobs run serially. For example, in the personal business department, some jobs can be executed in a serial manner, such as Job 1, job 3, Job 7 and Job 8, while some jobs can be executed concurrently or in parallel if there is no business logic relationship or interrelationship between them, such as Job 3, Job 4, Job 5 and Job 6.

Figure 5:
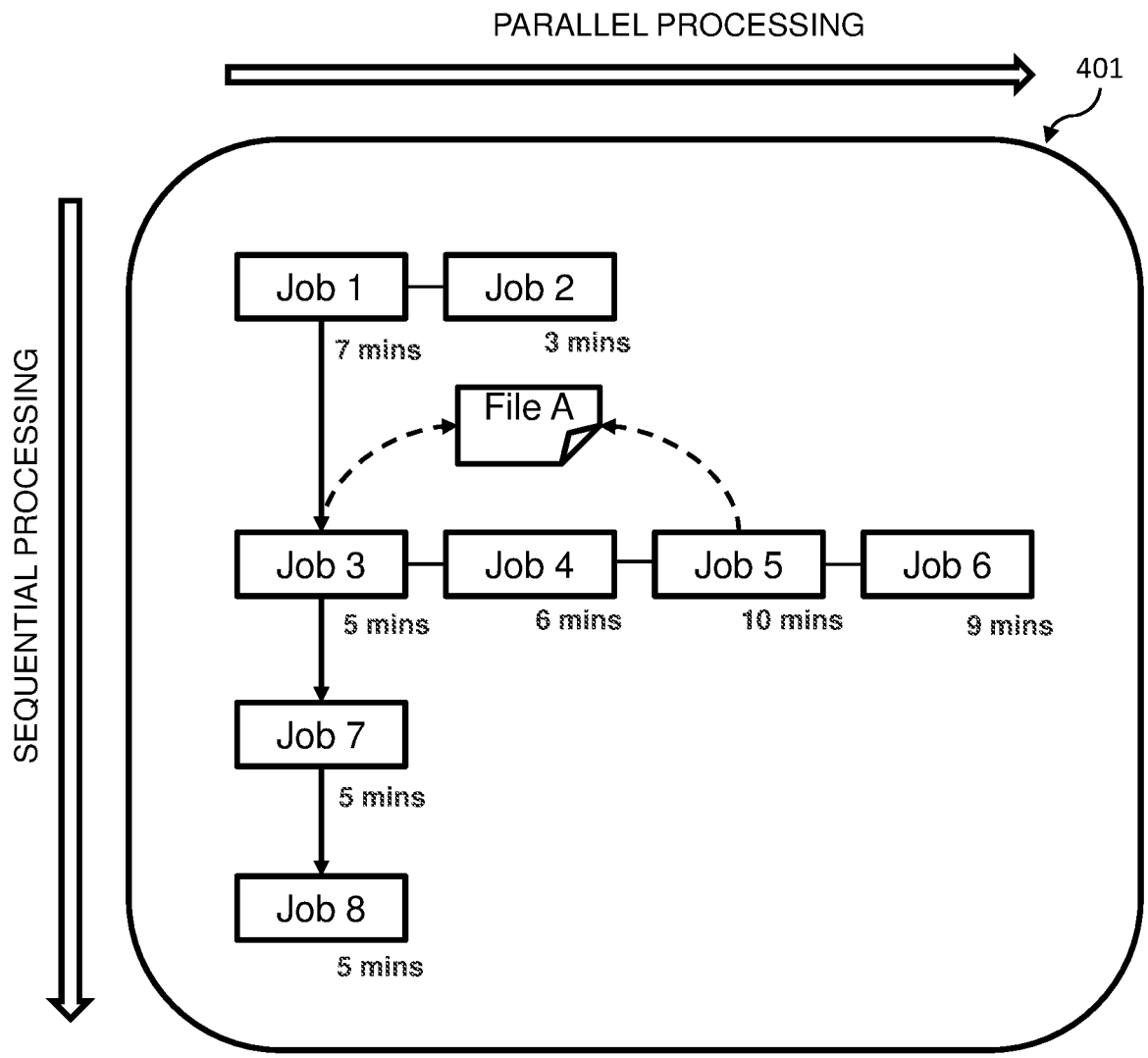
FIG. 5 depicts running time of each batch job and consumed resources by batch jobs in a set.

FIG. 5 depicts running time of each batch job and consumed resources by batch jobs in Set 401. Some jobs may consume the same resource(s) concurrently, for example, Job 3 and Job 5 both need to access File A. If two jobs access the file A at the same time, it may cause resource conflicts in the batch scheduler. Thus, the batch scheduler cannot directly execute the order of batch jobs shown as FIG. 4. If the batch scheduler allows Job 5 access to File A firstly, and also makes the order of execution Job 1->Job 5->Job 3->Job 7->Job 8 (here "->" represents serial access and "//" represents parallel access), then the total time of Set 401 of batch jobs is 7+10+5+5+5=27 minutes, which exceeds the batch window (25 minutes). However, if the batch scheduler allows Job 3 access to File A first, and also makes the execution order Job 1->Job 3->(Job 5//(Job 7->Job 8)), then the total time of Set 401 of batch jobs is 7+5+10/45+5)=22 minutes which is within the batch window (25 minutes). In addition, the latter scheduling of batch jobs also saves execution time of a set of batch jobs.

Therefore, it is desired to optimize scheduling of batch jobs to complete the batch jobs in as short of a period of time as possible as well as to avoid the problem of concurrent consuming of resources by a plurality of batch jobs.

The parameters for implementing a batch job may, for example, comprise the parameters selected from the following: resource(s) used by the batch job, the execution time of the batch job, and the like.

The term "resource" refers to parameters, capabilities or functions of computing devices that support the operation of a batch job. The same computer device is generally associated with several resources. Similarly, the same resource can be consumed by (such as accessed by or shared among) multiple batch jobs. Once the resource is consumed by one batch job, the resource is locked, and other batch jobs cannot consume the resource. Only when the resource is released by the consuming batch job, other batch jobs can compete to consume the resource. Resources can be hardware resources or software resources. For example, hardware resources may include disks, memory, networks, processors, RAM and the like, and software resources may include files, tables in a database, database connections, and the like. "resource use" refers to the consumption of a resource by batch jobs.

Figure 6:
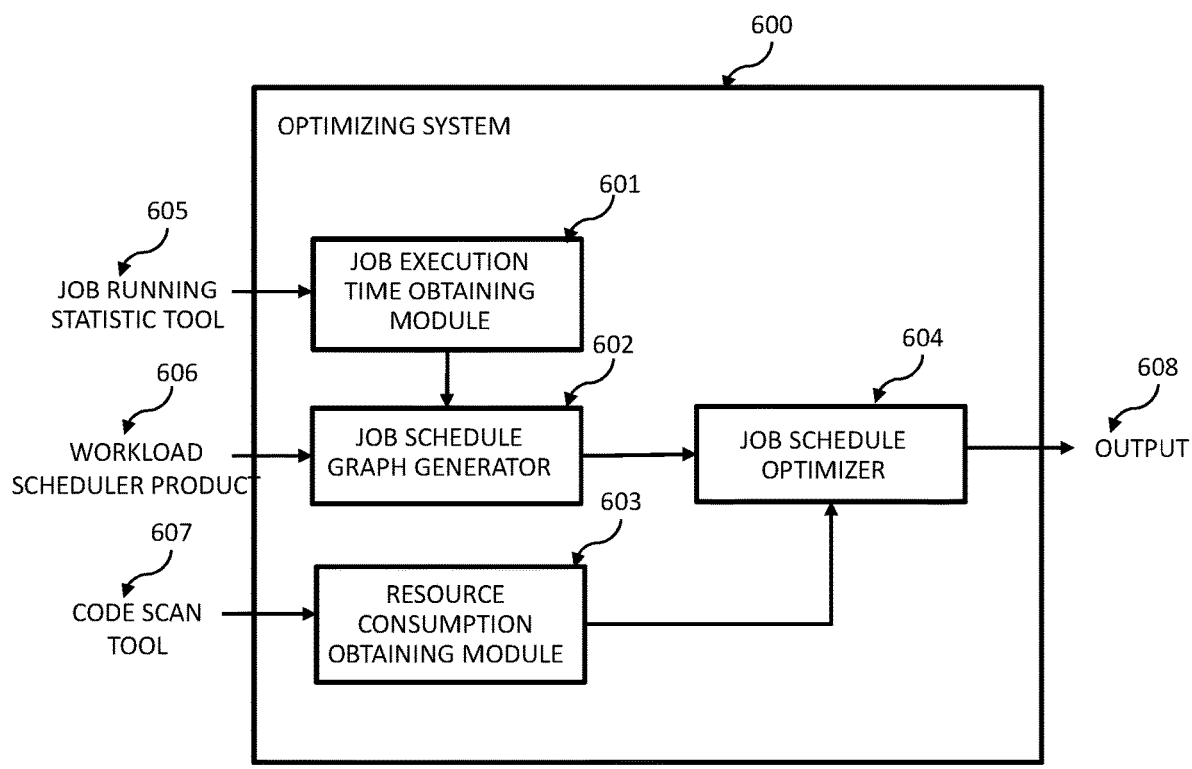
FIG. 6 depicts a schematic diagram of a proposed exemplary optimizing system for optimizing the scheduling of batch jobs according to some embodiments of the present disclosure.

FIG. 6 depicts a schematic diagram of a proposed exemplary optimization system 600 for optimizing the scheduling of batch jobs according to some embodiments of the present disclosure. Optimization system 600 can be a standalone tool for optimizing the scheduling of batch jobs or a component/plug-in of an existing workload scheduler product, such as IBM Tivoli Workload Scheduler (TWS). When optimization system 600 is implemented as the standalone tool, it should be noted that optimization system 600 according to embodiments of this disclosure could be implemented by computer system/server 12 of FIG. 1 or by cloud computing node 10 shown in FIG. 2. When optimization system 600 is implemented as the component/plug-in of an existing workload scheduler product, the existing workload scheduler product according to embodiments of this disclosure may be implemented by computer system/server 12 of FIG. 1 or by cloud computing node 10 shown in FIG. 2. Also, optimization system 600 may be a software component of the existing workload scheduler product.

As shown in FIG. 6, optimization system 600 may comprise job execution time obtaining module 601, job schedule graph generator 602, resource consumption obtaining module 603 and job schedule optimizer 604. It will be understood that FIG. 6 provides only an illustration of an example implementation system and does not imply any limitations with regard to the systems in which different embodiments may be implemented. Many modifications to the illustrated system environment may be made.

Referring to FIG. 6, job execution time obtaining module 601 is configured to obtain respective execution time for each batch jobs in a set of batch jobs, such as Set 401. In some embodiments, job execution time obtaining module 601 may obtain respective execution times for respective batch jobs in a set of batch jobs directly from, for example, job running statistic tool 605, which monitors and carries on the statistics of execution time for respective batch jobs in the set of batch jobs. In some embodiments, job running statistic tool 605 just monitors the execution of each batch job in the set of batch jobs to get respective execution times of respective batch jobs multiple times. In certain embodiments, the job running statistic tool 605 may input all monitored execution times for respective batch jobs in the set of batch jobs to the job execution time obtaining module 601. Then, the job execution time obtaining module 601 may get an average running time of each batch job as the output of job execution time obtaining module 601 to job schedule graph generator 602. In some embodiments, job execution time obtaining module 601 may enable a user to input execution time of each batch job directly via job running statistic tool 605 as the output of job execution time obtaining module 601 and the input of job schedule graph generator 602.

In some embodiments, job schedule graph generator 602 is configured to generate a directed weighted graph for the set of batch jobs to be optimized for scheduling. On the one hand, job schedule graph generator 602 may get respective execution times for each of the batch jobs in the set of batch jobs from job execution time obtaining module 601. On the other hand, job schedule graph generator 602 may obtain all batch jobs of the set of batch jobs and their connection relationship from workload scheduler product 606, such as TWS, or from a batch jobs description file. All batch jobs and their connection relationship of Set 401 of batch jobs shown in FIG. 5 is an example of the output of workload scheduler product 606. In some embodiments, a user may edit all batch jobs of the set of batch jobs and their connection relationship from a user interface (UI) tool external from optimization system 600.

In some embodiments, when generating the directed weighted graph for the set of batch jobs, job schedule graph generator 602 may represent a batch job as a node of the directed weighted graph, represent a directed connection between two batch jobs as a directed edge between two corresponding nodes of the directed weighted graph, represent execution time of each batch job as weight of each node of the directed weighted graph, and add two pseudo nodes to the directed weighted graph to represent a root node and an end node of the directed weighted graph respectively.

Figure 7:
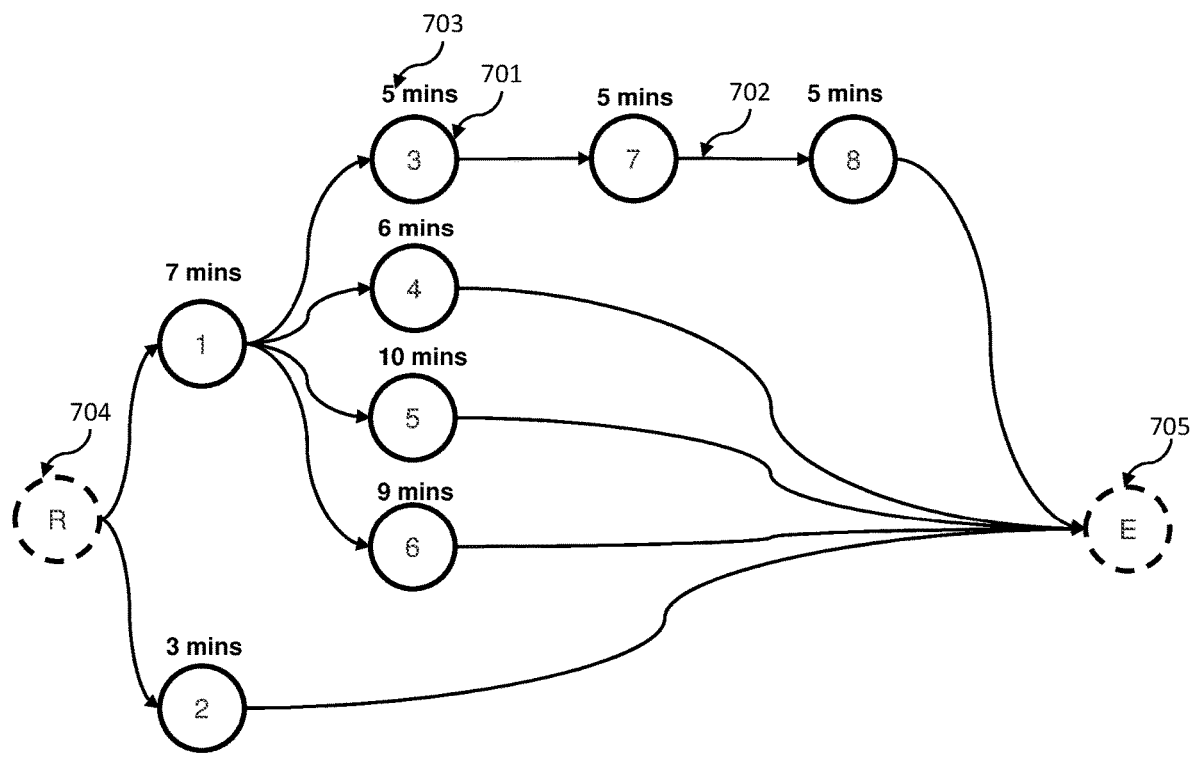
FIG. 7 depicts a directed weighted graph for a set of batch jobs shown in FIG. 5 according to some embodiments of the present disclosure.

As shown in FIG. 7, a directed weighted graph for Set 401 of batch jobs shown in FIG. 5 is depicted, in which node 701 represents batch job 3, directed edge 702 represents a directed connection between batch job 7 and batch job 8, 703 represents that a weight of node 701 is 5, pseudo node 704 represents the root node and pseudo node 705 represents the end node. In the following, when discussing a directed weighted graph for the set of batch jobs, two terms "node" and "batch job" have the same meaning and can be used interchangeably.

In some embodiments, resource consumption obtaining module 603 is configured to obtain information of consumption of same resources among batch jobs in the set of batch jobs. Referring again to FIG. 6, resource consumption obtaining module 603 may obtain resources consumed by each batch job from a code scan tool 607, which scans codes of each batch job to analyze the behavior of each batch job and get resource(s) consumed by each batch job for each of the phases of each batch job. Resource consumption obtaining module 603 then obtains the information of consumption of the same resources from the resource(s) consumed by each batch job. In some embodiments, resource consumption obtaining module 603 may represent the information of consumption of the same resources among batch jobs as a resource consumption matrix (RCM), which is a n×n matrix, where n is the number of batch jobs in the set of batch jobs. In the RCM, resources are labeled separately, for example, a resource File A is labeled as 1, a resource File B is labeled as 2, a resource memory is labeled as 3, and so on. For example, the RCM of Set 401 is shown below:

|   | 1 | 2 | 3 | 4 | 5 | 6 | 7 | 8 |
|---|---|---|---|---|---|---|---|---|
| 1 | 0 | 0 | 0 | 0 | 0 | 0 | 0 | 0 |
| 2 | 0 | 0 | 0 | 0 | 0 | 0 | 0 | 0 |
| 3 | 0 | 0 | 0 | 0 | 1 | 0 | 0 | 0 |
| 4 | 0 | 0 | 0 | 0 | 0 | 0 | 0 | 0 |
| 5 | 0 | 0 | 1 | 0 | 0 | 0 | 0 | 0 |
| 6 | 0 | 0 | 0 | 0 | 0 | 0 | 0 | 0 |
| 7 | 0 | 0 | 0 | 0 | 0 | 0 | 0 | 0 |
| 8 | 0 | 0 | 0 | 0 | 0 | 0 | 0 | 0 |

Where an element in the i-th row and the j-th column of the RCM indicates the situation that the i-th batch job and the j-th batch job both consume resource 1. If the i-th batch job and the j-th batch job do not consume any same resources, the two elements of RCM(i,j) are RCM(j,i) are 0; if the i-th batch job and the j-th batch job both consume the resource of file A whose label is 1, then the two elements of RCM(i,j) are RCM(j,i) are 1; and if the i-th batch job and the j-th batch job both consume the resource of file B whose labeled is 2, then the two elements of RCM(i,j) are RCM(j,i) are 2; and so on. It can be seen that the RCM is a symmetric matrix. It should be appreciated that the RCM is only a type of data structure that represents the information of consumption of the same resources among batch jobs. The information of consumption of the same resources among batch jobs can also be represented by other data structures, or can be represented in the form of files instead of data structures, such as XML files, etc.

In some embodiments, job schedule optimizer 604 is configured to optimize the directed weighted graph for the set of batch jobs based on the information of consumption of same resources among batch jobs. In other words, job schedule optimizer 604 may receive the directed weighted graph for the set of batch jobs from job schedule graph generator 602 and the information of consumption of same resources among batch jobs from resource consumption obtaining module 603, and then optimize the directed weighted graph for the set of batch jobs based on the information of consumption of the same resources among batch jobs to avoid problems of simultaneous consumption of the same resource(s) as well as completing the task in a minimum period of time.

Figure 8A:
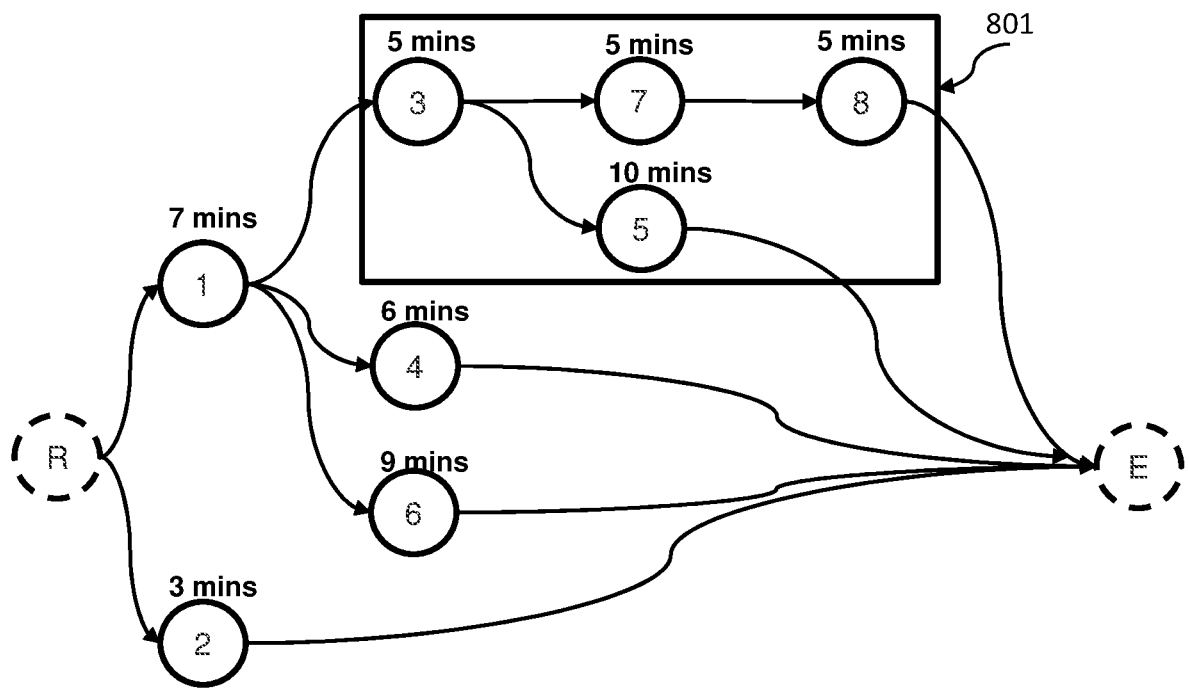
FIG. 8a and FIG. 8b depict two re-organized directed weighted graphs for the set of batch jobs shown in FIG. 7 according to some embodiments of the present disclosure.
Figure 8B:
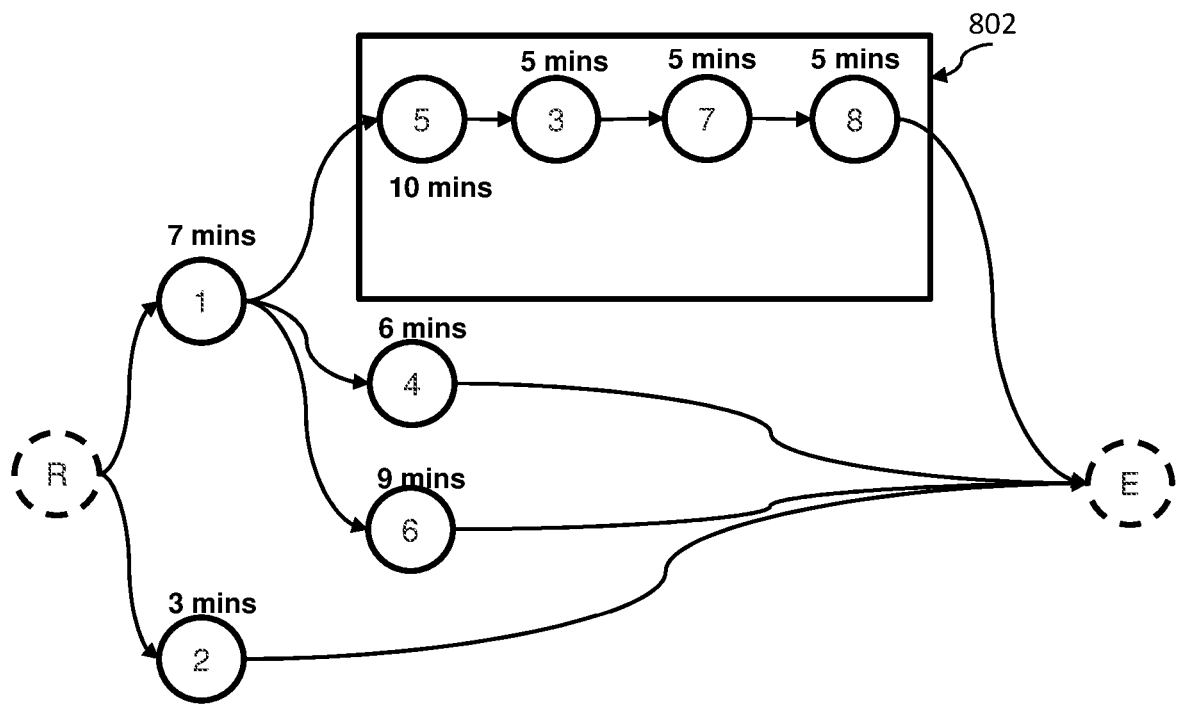

In some embodiments, during optimizing the directed weighted graph for the set of batch jobs based on the information of consumption of same resources among batch jobs, job schedule optimizer 604 may, in a first implementation, first access each node of the directed weighted graph for the set of batch jobs using, for example, an existing Breadth-First-Search (BFS) algorithm so that all nodes in the directed weighted graph can be accessed. In general, the BFS algorithm is an algorithm for traversing or searching tree or graph data structures. It starts at the tree root (or some arbitrary node of a graph, sometimes referred to as a 'search key') and explores all of the neighbor nodes at the present depth prior to moving on to the nodes at the next depth level. In the following, the directed weighted graph for Set 401 of batch jobs shown in FIG. 7 and the above RCM for Set 401 are taken as examples of the input of job schedule optimizer 604 to explain how job schedule optimizer 604 should optimize the directed weighted graph in the first implementation. Job schedule optimizer 604 may first access node 1 and node 2 in parallel in the first level of the directed weighted graph. Since batch job 1 and batch job 2 do not consume any same resource as indicated in RCM (RCM(1, 2)=RCM(2,1)=0), job schedule optimizer 604 may continue to search for parallel sub-nodes in a next level of node 1, i.e. nodes 3, 4, 5, and 6. In this level, since batch job 3 and batch job 5 consume the resource of file A whose label is 1 (RCM(3,5)=RCM(5,3)=0) and other parallel jobs do not consume any same resource according to the RCM, job schedule optimizer 604 may re-organize the sequence (order) for node 3 and node 5. In batch job sequence arrangement 1, job schedule optimizer 604 may make batch job 3 consume File A first, then the directed weighted graph shown in FIG. 5 may be changed into a re-organized directed weighted graph for Set 401 of batch jobs shown in FIG. 8a, and the total execution time of Set 401 of batch jobs is 7+5+10//(5+5)=22 minutes, which is within the batch window (25 minutes). In batch job sequence arrangement 2, job schedule optimizer 604 may make batch job 5 consume File A first, then the directed weighted graph shown in FIG. 5 may be changed into a re-organized directed weighted graph for Set 401 of batch jobs shown in FIG. 8b, and the total execution time of Set 401 of batch jobs is 7+10+5+5+5=27 minutes, which exceeds the batch window (25 minutes). It can be determined that batch job sequence arrangement 1 is a better solution as the total execution time of Set 401 of batch jobs in batch job sequence arrangement 1 is less than the one in batch job sequence arrangement 2. And since there is no other information of consumption of same resources among nodes in the remaining level of the directed weighted graph, job schedule optimizer 604 may output the re-organized directed weighted graph in batch job sequence arrangement 1 shown in FIG. 8a as an optimized result.

In some embodiment, still in the first implementation, if more parallel batch jobs than two parallel nodes consume the same resource(s) based on the information of consumption of same resource(s) among batch jobs in Set 401 of batch jobs, job schedule optimizer 604 may arrange these parallel batch jobs into a plurality of batch job sequence arrangements, such as in a mathematical arrangement. For example, if there are 3 parallel nodes (e.g. job 3, job 5, and job 4), then there are 6 batch job sequence arrangements i.e. $p_3^3=3\times2\times1=6$, the 6 batch job sequence arrangements can be (job 3, job 4, job 5), (job 3, job 5, job 4), (job 4, job 3, job 5), (job 4, job 5, job 3), (job 5, job 3, job 4), and (job 5, job 4, job 3). Then job schedule optimizer 604 may calculate respective execution time of the set of batch jobs for respective batch job sequence arrangement and select a batch job sequence arrangement with minimum total execution time of the set of batch jobs as the batch job sequence used in an optimized directed weighted graph, which is the output of job schedule optimizer 604. In some embodiments, if two or more batch job sequence arrangements satisfy the requirement of minimum total execution time of the set of batch jobs, one of the two or more batch job sequence arrangements can be selected randomly as batch job sequence used in an optimized directed weighted graph.

In some embodiment, if there are other resource(s) which are consumed by two or more batch jobs, the above process may be repeatedly to avoid resource conflict in the set of batch jobs as well as decrease processing times of the set of batch jobs.

In some embodiments, during optimizing the directed weighted graph for the set of batch jobs based on the information of consumption of same resources among batch jobs, job schedule optimizer 604 may, in a second implementation, first access the information of consumption of same resources among batch jobs such as the RCM to obtain related batch jobs consuming the same resource(s) in the set of batch jobs, and then determine whether the related batch jobs consuming the same resource(s) are parallel batch jobs based on the directed weighted graph. If job schedule optimizer 604 determines that the related batch jobs consuming the same resource(s) are parallel batch jobs, job schedule optimizer 604 may arrange the related batch jobs into a plurality of batch job sequence arrangements, such as in a mathematical arrangement, and then job schedule optimizer 604 may calculate respective total execution time of the set of batch jobs for respective batch job sequence arrangements and select the batch job sequence arrangement with minimum total execution time of the set of batch jobs as the batch job sequence used in an optimized directed weighted graph, i.e. the output of job schedule optimizer 604. If two or more batch job sequence arrangements satisfy the requirement of minimum total execution time of the set of batch jobs, job schedule optimizer 604 may select randomly one of the two or more batch job sequence arrangements as the batch job sequence arrangement for the output of job schedule optimizer.

Still take the directed weighted graph for Set 401 of batch jobs shown in FIG. 7 and the above RCM for Set 401 as examples of input of job schedule optimizer 604 to explain how job schedule optimizer 604 optimize the directed weighted graph in the second implementation. Based on the above RCM for Set 401, job schedule optimizer 604 may determine that batch job 3 and batch job 5 are related batch jobs as they both consume the resource File A. Job schedule optimizer 604 may further determine that both job 3 and job 5 are parallel batch jobs based on the directed weighted graph for Set 401 of batch jobs. Then, job schedule optimizer 604 may arrange the two batch jobs in a mathematical arrangement, such as batch job sequence arrangement 1 (job 3, job 5) and batch job sequence arrangement 2 (job 5, job 3) as before. Similar to the above embodiments, batch job sequence arrangement 1 with total execution time of 22 min, less than that of batch job sequence arrangement 2, is selected as the batch job sequence arrangement for the output of job schedule optimizer 604. If more parallel batch jobs than two consume the same resource(s) or there are other resources which are consumed by two or more batch jobs, the processing is similar to the above embodiment.

Figure 9:
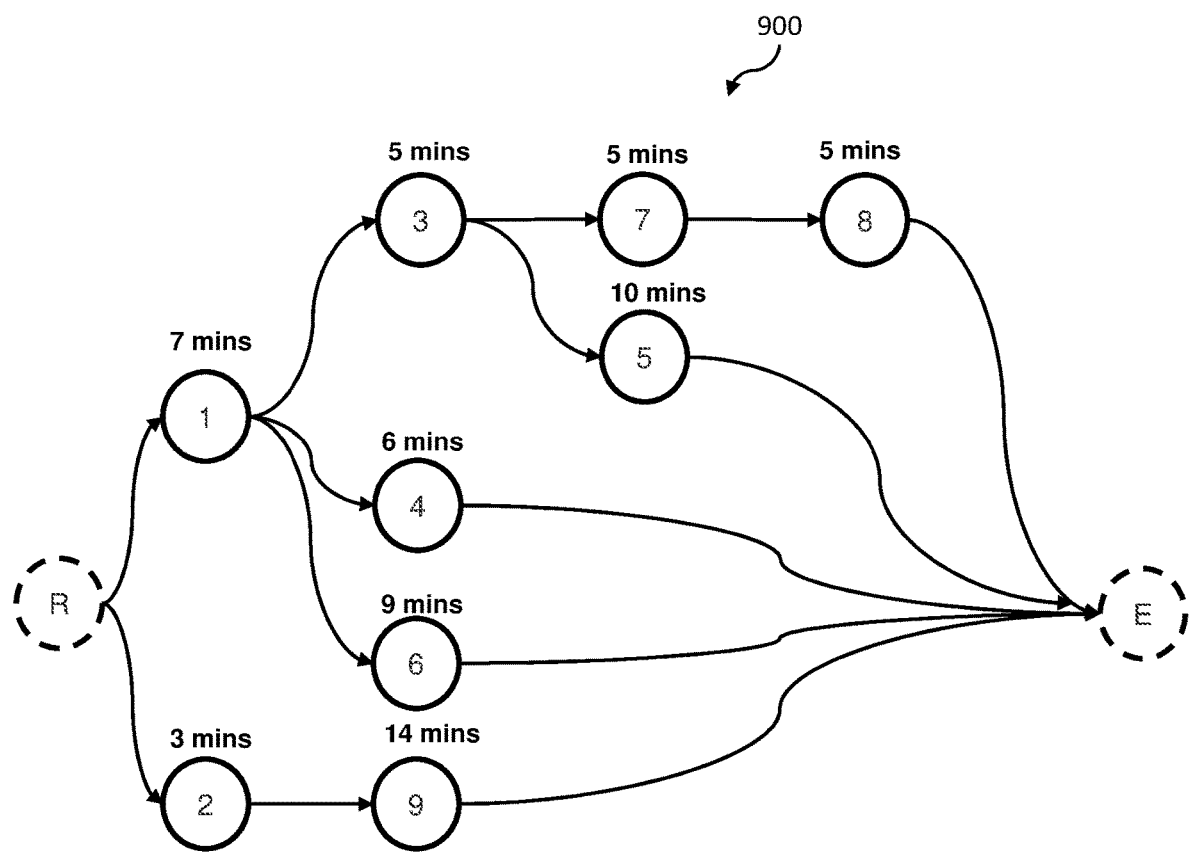
FIG. 9 depicts another directed weighted graph for another set of batch jobs according to some embodiments of the present disclosure.

In some embodiments, during optimizing the directed weighted graph for the set of batch jobs based on the information of consumption of same resources among batch jobs, some batch jobs are above mentioned related batch jobs consuming the same resource(s), but the related batch jobs are not parallel batch jobs based on the directed weighted graph. For example, FIG. 9 depicts another directed weighted graph for another Set 900 of batch jobs according to some embodiments of the present disclosure, in which the total execution time of Set 900 is 22 min. Job schedule optimizer 604 determine that job 4 and job 9 both consume the same resource (File B) according to the information of consumption of same resources among batch jobs and both batch jobs are the above mentioned related batch jobs. Job schedule optimizer 604 may determine that the two batch jobs are not parallel jobs based on the directed weighted graph and may further determine the execution time periods for both job 4 and job 9 are (7th min-13th min) and (3th min-17th min) after Set 900 begins to run respectively. The two execution time periods have time overlap so job schedule optimizer 604 may determine that both batch jobs consume the resource File B concurrently.

Figure 10A:
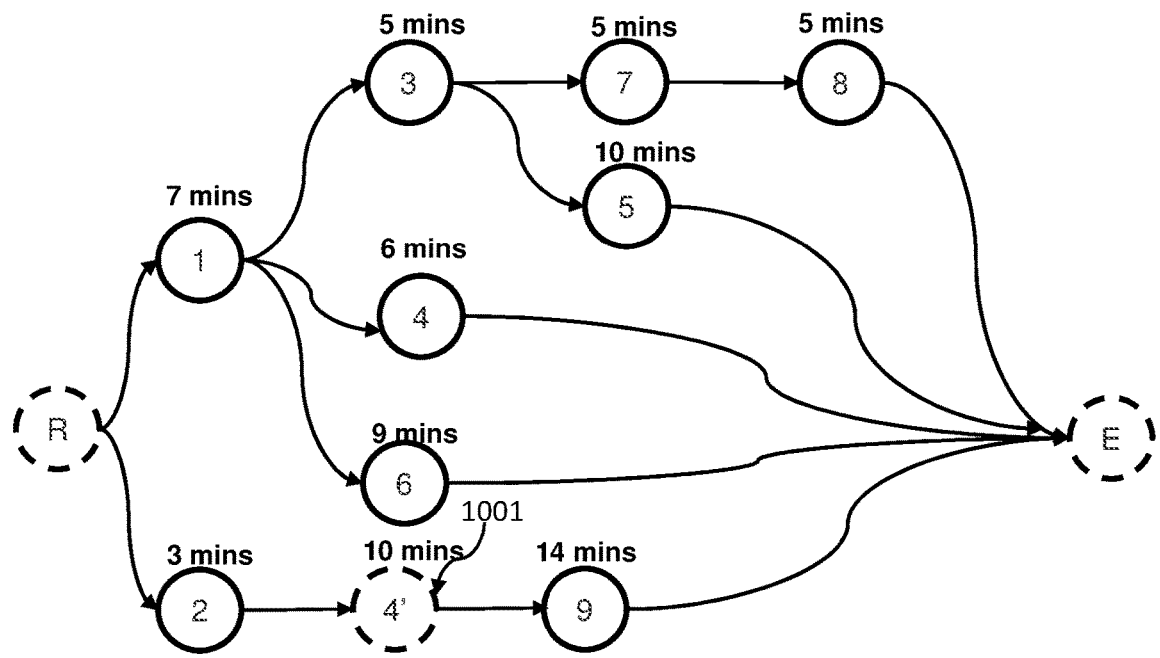
FIG. 10a and FIG. 10b depict two re-organized directed weighted graphs for the set of batch jobs shown in FIG. 9 according to some embodiments of the present disclosure.

Referring now to FIG. 10a, in some embodiments, job schedule optimizer 604 may arrange the two batch jobs into a plurality of batch job sequence arrangements, such as in a mathematical arrangement, for example, batch job sequence arrangement 3 (job 9, job 4) and batch job sequence arrangement 4 (job 4, job 9). In batch job sequence arrangement 3, job schedule optimizer 604 may make job 4 consume the resource File B first by adding an empty job 4' indicated by 1001 with the execution time as 7+6−3=10 mins before batch job 9 to form a re-organized directed weighted graph for Set 900 of batch jobs, as shown in FIG. 10a. Then the local execution time related to job 9 for Set 900 is 3+10+14=27 min.

Figure 10B:
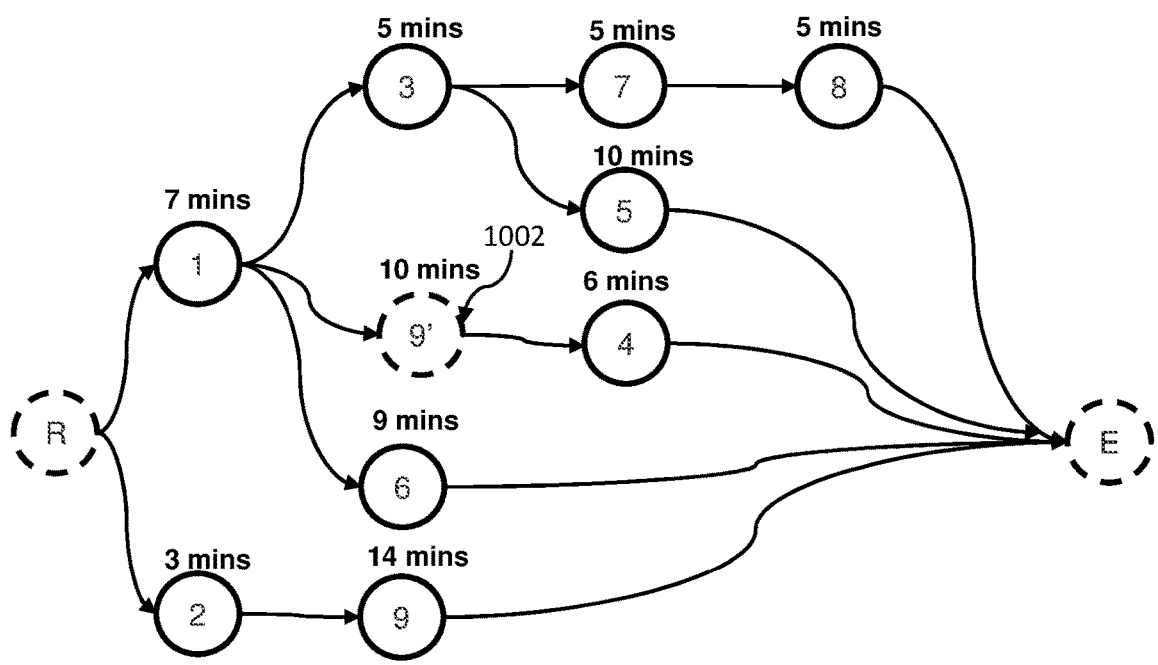

Referring now to FIG. 10b, in batch job sequence arrangement 4, job schedule optimizer 604 may make job 9 consume the resource File B first by adding an empty job 9' indicated by 1002 with the execution time as 3+14−7=10 min before batch job 4 to form a re-organized directed weighted graph for Set 900 of batch jobs. Then, the local execution time related to job 4 for Set 900 is 7+10+6=23 min. The execution time for both batch job sequence arrangement 3 and batch job sequence arrangement 4 is more than the execution time of Set 900 (22 min) but the execution time for batch job sequence arrangement 4 is less than the execution time for batch job sequence arrangement 4, thus, job schedule optimizer 604 may select the batch job sequence arrangement 4 with empty batch job 9' as the optimized directed weighted graph for Set 900, as shown in FIG. 9.

In some embodiments, in the first implementation, it may be difficult to determine that some batch jobs are not parallel batch jobs but consume the same resource(s) concurrently. Therefore, after all parallel batch jobs are processed, optimization system 600 may obtain information of consumption of same resources among batch jobs in the set of batch jobs for the optimized directed weighted graph output by the first implementation and execute part of the second implementation to obtain a further optimized directed weighted graph.

Figure 11:
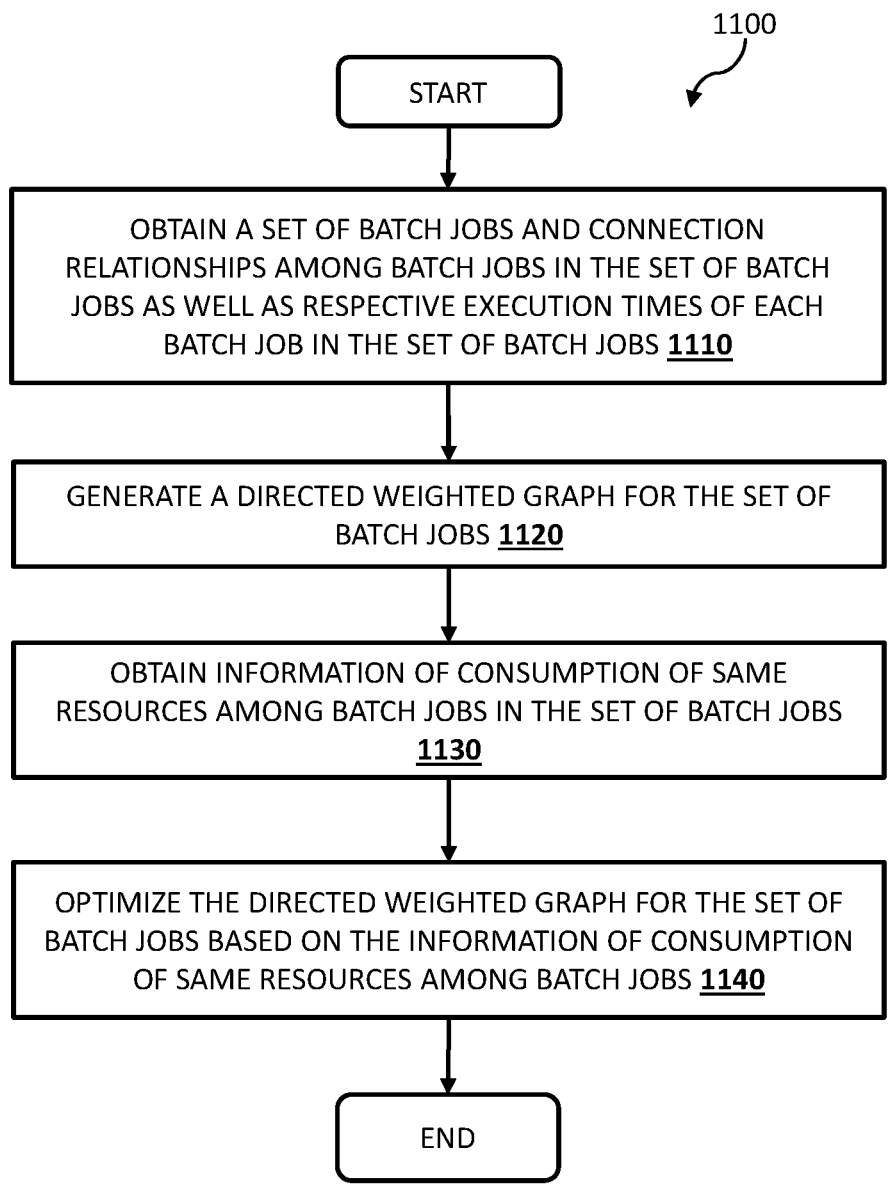
FIG. 11 depicts a flowchart of an exemplary method for optimizing scheduling of batch jobs according to some embodiments of the present disclosure.

FIG. 11 depicts a flowchart of an exemplary method 1100 for optimizing scheduling of batch jobs according to some embodiments of the present disclosure. The method 1100 may be implemented by optimization system 600 in FIG. 6, or any other suitable computer/computing systems. For ease of understanding, the method 1100 will be described with reference to FIG. 6.

At operation 1110, optimization system 600 may obtain a set of batch jobs and connection relationships among batch jobs in the set of batch jobs as well as respective execution times of respective batch jobs in the set of batch jobs.

At operation 1120, optimization system 600 may a directed weighted graph for the set of batch jobs, where in the directed weighted graph, a node represents a batch job, a directed edge between two nodes represents a directed connection between two corresponding batch jobs, weight of a node represents execution time of a batch job corresponding to the node, and two pseudo nodes represent a root node and an end node respectively.

At operation 1130, optimization system 600 may obtain information of consumption of same resources among batch jobs in the set of batch jobs.

At operation 1140, optimization system 600 may optimize the directed weighted graph for the set of batch jobs based on the information of consumption of same resources among batch jobs to obtain an optimized directed weighted graph for the set of batch jobs.

Figure 12:
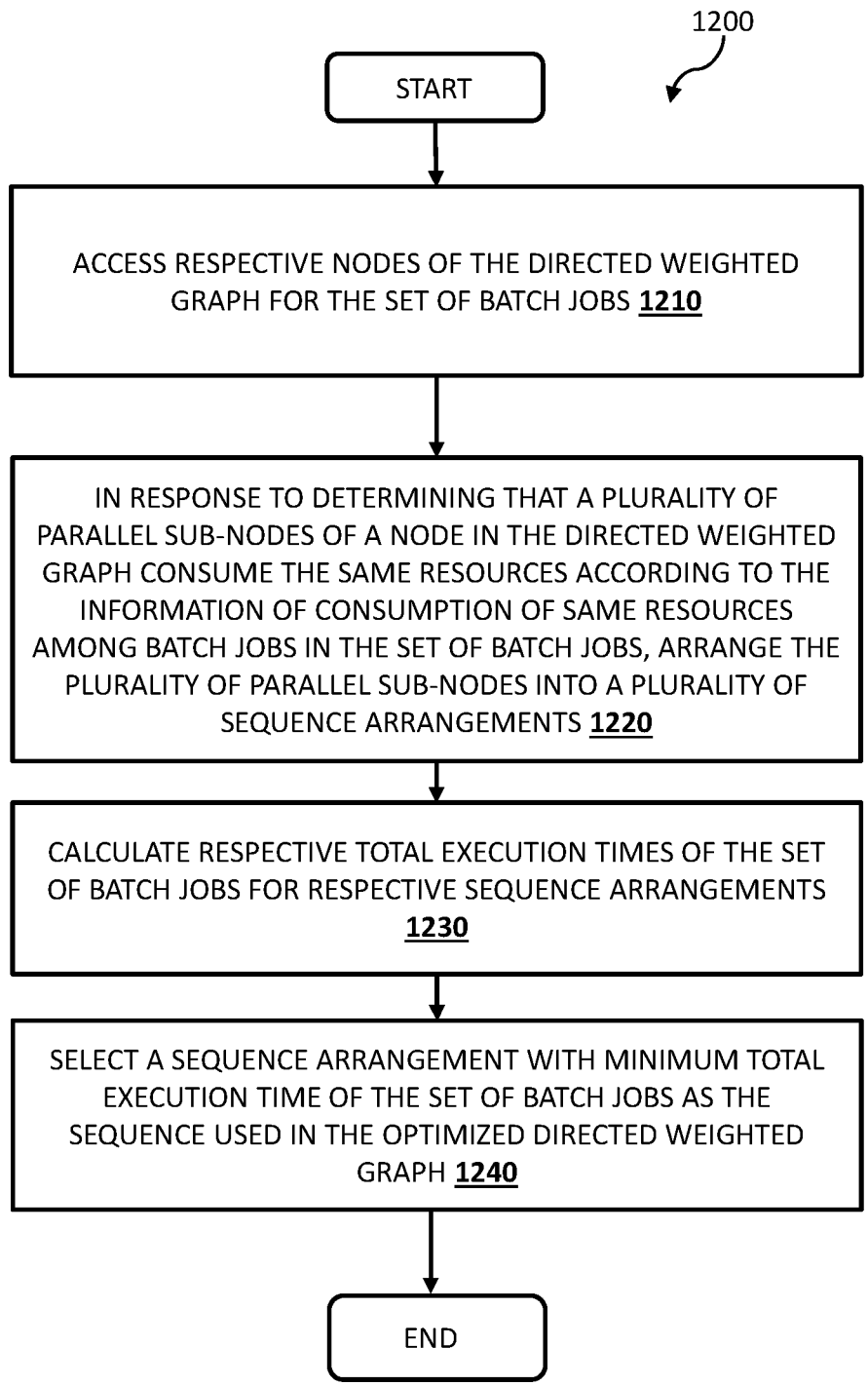
FIG. 12 depicts a flowchart of an exemplary method for implementing operation 1140 shown in FIG. 11 according to some embodiments of the present disclosure.

In some embodiments, FIG. 12 depicts a flowchart of an exemplary method 1200 for implementing operation 1140 shown in FIG. 11 according to some embodiments of the present disclosure. For ease of understanding, the method 1200 will be described with reference to FIG. 6.

At operation 1210, optimization system 600 may access respective nodes of the directed weighted graph for the set of batch jobs using the Breadth-First-Search (BFS) algorithm.

At operation 1220, in response to determining that a plurality of parallel sub-nodes of a node in the directed weighted graph consume the same resource(s) according to the information of consumption of same resources among batch jobs in the set of batch jobs, optimization system 600 may arrange the plurality of parallel sub-nodes into a plurality of batch job sequence arrangements, such as in a mathematical arrangement.

At operation 1230, optimization system 600 may calculate respective total execution times of the set of batch jobs for respective batch job sequence arrangements.

At operation 1240, optimization system 600 may select a batch job sequence arrangement with a minimum total execution time of the set of batch jobs as the batch job sequence used in the optimized directed weighted graph.

Figure 13:
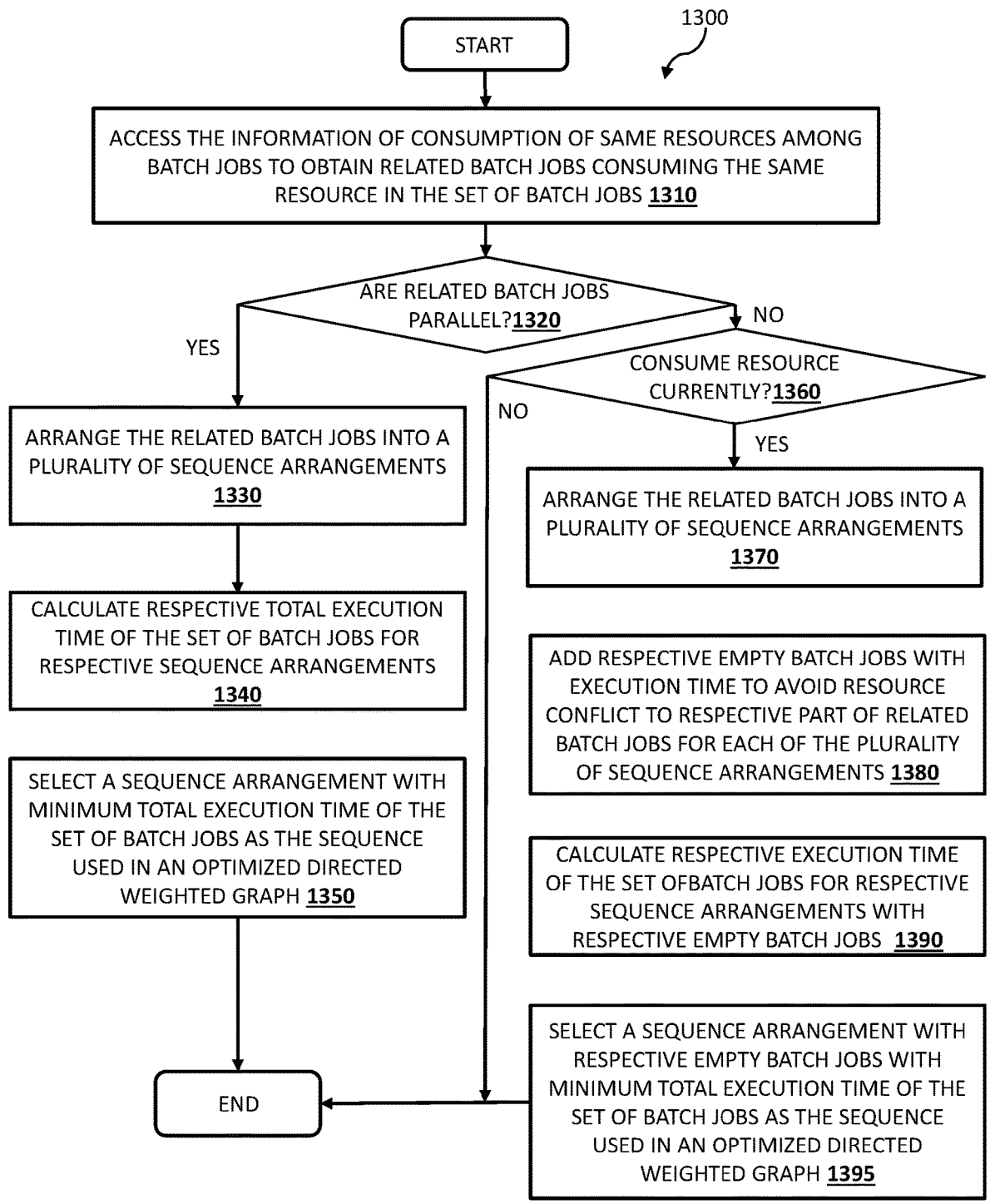
FIG. 13 depicts another flowchart of an exemplary method for implementing operation 1140 shown in FIG. 11 according to some embodiments of the present disclosure.

In some embodiments, FIG. 13 depicts another flowchart of an exemplary method 1300 for implementing operation 1140 shown in FIG. 11 according to some embodiments of the present disclosure. For ease of understanding, the method 1300 will be described with reference to FIG. 6.

At operation 1310, optimization system 600 may access the information of consumption of same resources among batch jobs to obtain related batch jobs consuming the same resource(s) in the set of batch jobs.

At operation 1320, optimization system 600 may determine whether the related batch jobs are parallel batch jobs according to the directed weighted graph for the set of batch jobs.

In response to determining that the related batch jobs are parallel batch jobs, optimization system 600 may first arrange the related batch jobs into a plurality of batch job sequence arrangements, such as in a mathematical arrangement at operation 1330, then may calculate respective total execution time of the set of batch jobs for respective batch job sequence arrangements at operation 1340, and then may select a batch job sequence arrangement with a minimum total execution time of the set of batch jobs as the batch job sequence used in an optimized directed weighted graph at operation 1350.

In response to determining that the related batch jobs are not parallel batch jobs, optimization system 600 may further determine whether the related batch jobs consume the same resource(s) concurrently at operation 1360.

In response to determining that the related batch jobs consume the same resource(s) concurrently, optimization system 600 may first arrange the related batch jobs into a plurality of batch job sequence arrangements, such as in a mathematical arrangement at operation 1370, then may add respective empty batch jobs with execution time to avoid resource conflict to respective parts of related batch jobs for each of the plurality of batch job sequence arrangements at operation 1380, then may calculate respective execution time of the set of batch jobs for respective batch job sequence arrangements with respective empty batch jobs at operation 1390, and then may select a batch job sequence arrangement with respective empty batch jobs with a minimum total execution time of the set of batch jobs as the batch job sequence used in an optimized directed weighted graph at operation 1395.

Figure 14:
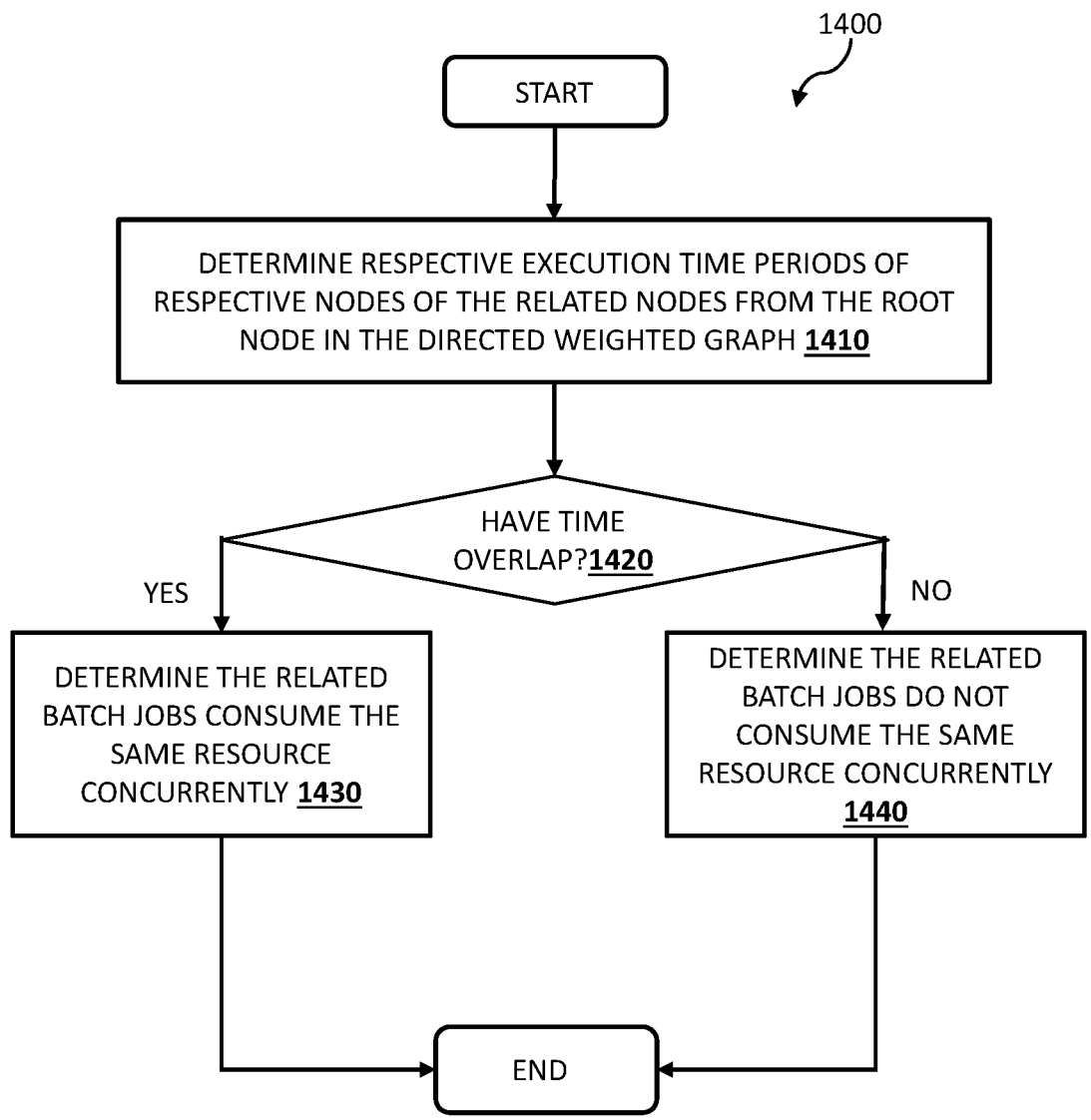
FIG. 14 depicts a flowchart of an exemplary method for implementing an operation shown in FIG. 13 according to some embodiments of the present disclosure.

In some embodiments, FIG. 14 depicts a flowchart of an exemplary method 1400 for implementing the operation 1370 shown in FIG. 13 according to some embodiments of the present disclosure. For ease of understanding, the method 1400 will be described with reference to FIG. 6.

At operation 1410, optimization system 600 may determine respective execution times of respective nodes of the related nodes from the root node in the directed weighted graph.

At operation 1420, optimization system 600 may determine whether respective execution time periods of respective nodes of the related nodes have time overlap.

At operation 1430, in response to determining that respective execution time periods of respective nodes of the related nodes have time overlap, optimization system 600 may determine the related batch jobs consume the same resource(s) concurrently. Otherwise, at 1440, optimization system 600 may determine the related batch jobs do not consume the same resource(s) concurrently.

In some embodiments, the information of consumption of same resources among batch jobs is represented as a RCM, which is a n×n matrix, n is the number of batch jobs in the set, an element in the i-th row and the j-th column of the RCM indicates the situation that the i-th batch job and the j-th batch job consume resource(s) concurrently. In some embodiments, resources are labeled separately in the RCM, and if the i-th batch job and the j-th batch job do not consume any same resource(s), the two elements of RCM (i,j) are RCM(j,i) are 0; if the i-th batch job and the j-th batch job consume the resource of file A whose label is 1, then the two elements of RCM(i,j) are RCM(j,i) are 1; and if the i-th batch job and the j-th batch job consume the resource of file B whose label is 2, then the two elements of RCM(i,j) are RCM(j,i) are 2; and so on.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration and are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   obtaining, by one or more processors,
      a set of batch jobs,
      connection relationships among batch jobs in the set of batch jobs, and
      a respective execution time of each batch job in the set of batch jobs;
   generating, by the one or more processors, a directed weighted graph for the set of batch jobs, wherein in the directed weighted graph, a node represents a batch job, a directed edge between two of the nodes represents a directed connection between two corresponding batch jobs, a weight of the node represents the execution time of the batch job corresponding to the node;
   obtaining, by the one or more processors, information of consumption of same resource(s) among the batch jobs in the set of batch jobs to obtain related batch jobs consuming the same resource(s) in the set of batch jobs;
   optimizing, by the one or more processors, the directed weighted graph based on the information of consumption of same resource(s) among the batch jobs in the set of batch jobs;
   determining, by the one or more processors, whether the related batch jobs are parallel batch jobs according to the optimized directed weighted graph for the set of batch jobs, and if the related batch jobs are not parallel batch jobs and consume the same resource(s) concurrently, further optimizing the directed weighted graph to prevent concurrent consumption of the same resources;
   arranging, by the one or more processors, the batch jobs into a plurality of batch job sequence arrangements;
   calculating, by the one or more processors, respective total execution time of the set of batch jobs for respective batch job sequence arrangements;
   selecting, by the one or more processors, a batch job sequence arrangement with a minimum total execution time of the set of batch jobs as a batch job sequence used in the further optimized directed weighted graph; and
   executing the processing of the batch jobs according to the batch job sequence arrangement, the executing including, for each batch job, causing one or more of the resources to be locked while the batch job is being executed to prevent other batch jobs from consuming the same resources, and then causing the resources to be released after the respective batch job is completed, wherein the information of consumption of same resources among the batch jobs in the set of batch jobs is represented as a resource consumption matrix (RCM), wherein the RCM is a n×n matrix, n is a number of batch jobs in the set, an element in an i-th row and a j-th column of the RCM indicates a situation that an i-th batch job and a j-th batch job consume resources.

2. The computer-implemented method of claim 1, wherein optimizing the directed weighted graph comprises:
   accessing, by the one or more processors, respective nodes of the directed weighted graph for the set of batch jobs; and in response to determining that a plurality of parallel sub-nodes of a node in the directed weighted graph consume the same resource(s) according to the information of consumption of same resources among the batch jobs in the set of batch jobs, arranging, by the one or more processors, the plurality of parallel sub-nodes into the plurality of batch job sequence arrangements.

3. The computer-implemented method of claim 1, wherein further optimizing the directed weighted graph further comprises:
   adding, by the one or more processors, respective empty batch jobs with execution time to avoid resource conflict to respective part of related batch jobs for each of the plurality of batch job sequence arrangements,
   wherein the calculating of the respective total execution time of the set of batch jobs for respective batch job sequence arrangements is performed with the respective empty batch jobs.

4. The computer-implemented method claim 1, wherein in the directed weighted graph, a first pseudo node represents a root node and a pseudo node represents an end node, and the determining whether the related batch jobs consume the same resource concurrently comprises:
   determining, by the one or more processors, respective execution time of respective nodes of related nodes from the root node in the directed weighted graph;
   determining, by the one or more processors, whether respective execution time periods of respective nodes of the related nodes have time overlap; and
   in response to determining that the respective execution time periods of respective nodes of the related nodes have the time overlap, determining, by the one or more processors, that the related batch jobs consume the same resource concurrently.

5. The computer-implemented method of claim 1, wherein the determining whether the related batch jobs consume the same resource concurrently further comprises:
   in response to determining that respective execution time periods of respective nodes of the related nodes have no time overlap, determining, by the one or more processors, that the related batch jobs do not consume the same resource concurrently.

6. A system, comprising:
   a processing unit; and
   a memory coupled to the processing unit and storing instructions thereon, the instructions, when executed by the processing unit, perform actions comprising:
   obtaining
       a set of batch jobs,
       connection relationships among batch jobs in the set of batch jobs, and
       a respective execution time of each batch job in the set of batch jobs;
   generating a directed weighted graph for the set of batch jobs, wherein in the directed weighted graph, a node represents a batch job, a directed edge between two of the nodes represents a directed connection between two corresponding batch jobs, a weight of the node represents the execution time of the batch job corresponding to the node;
   obtaining, by the one or more processors, information of consumption of same resource(s) among the batch jobs in the set of batch jobs to obtain related batch jobs consuming the same resource(s) in the set of batch jobs;
   optimizing, by the one or more processors, the directed weighted graph based on the information of consumption of same resource(s) among the batch jobs in the set of batch jobs;
   determining, by the one or more processors, whether the related batch jobs are parallel batch jobs according to the optimized directed weighted graph for the set of batch jobs, and if the related batch jobs are not parallel batch jobs and consume the same resource(s) concurrently, further optimizing the directed weighted graph to prevent concurrent consumption of the same resources;
   arranging, by the one or more processors, the batch jobs into a plurality of batch job sequence arrangements;
   calculating, by the one or more processors, respective total execution time of the set of batch jobs for respective batch job sequence arrangements;
   selecting, by the one or more processors, a batch job sequence arrangement with a minimum total execution time of the set of batch jobs as a batch job sequence used in the further optimized directed weighted graph; and
   executing the processing of the batch jobs according to the batch job sequence arrangement, the executing including, for each batch job, causing one or more of the resources to be locked while the batch job is being executed to prevent other batch jobs from consuming the same resources, and then causing the resources to be released after the respective batch job is completed, wherein the information of consumption of same resources among the batch jobs in the set of batch jobs is represented as a resource consumption matrix (RCM), wherein the RCM is a n×n matrix, n is a number of batch jobs in the set, an element in an i-th row and a j-th column of the RCM indicates a situation that an i-th batch job and a j-th batch job consume resources.

7. The system of claim 6, wherein optimizing the directed weighted graph comprises:
   accessing, by the one or more processors, respective nodes of the directed weighted graph for the set of batch jobs; and
   in response to determining that a plurality of parallel sub-nodes of a node in the directed weighted graph consume the same resource(s) according to the information of consumption of same resources among the batch jobs in the set of batch jobs, arranging, by the one or more processors, the plurality of parallel sub-nodes into the plurality of batch job sequence arrangements.

8. The system of claim 6, wherein further optimizing the directed weighted graph further comprises:
   adding, by the one or more processors, respective empty batch jobs with execution time to avoid resource conflict to respective part of related batch jobs for each of the plurality of batch job sequence arrangements;
   wherein the calculating of the respective total execution time of the set of batch jobs for respective batch job sequence arrangements is performed with the respective empty batch jobs.

9. The system of claim 6, wherein in the directed weighted graph, a first pseudo node represents a root node and a second pseudo node represents an end node, and the determining whether the related batch jobs consume the same resource concurrently comprises:
   determining, by the one or more processors, respective execution time of respective nodes of related nodes from the root node in the directed weighted graph;

determining, by the one or more processors, whether respective execution time periods of respective nodes of the related nodes have time overlap; and in response to determining that the respective execution time periods of respective nodes of the related nodes have the time overlap, determining, by the one or more processors, that the related batch jobs consume the same resource concurrently.

10. The system of claim 6, wherein the determining whether the related batch jobs consume the same resource concurrently further comprises:

in response to determining that respective execution time periods of respective nodes of the related nodes have no time overlap, determining, by the one or more processors, that the related batch jobs do not consume the same resource concurrently.

11. A computer program product, comprising:

one or more computer readable storage media, and program instructions collectively stored on the one or more computer readable storage media, the program instructions executable by one or more processors to cause the one or more processors to perform actions comprising:

obtaining
a set of batch jobs,
connection relationships among batch jobs in the set of batch jobs, and
a respective execution time of each batch job in the set of batch jobs;

generating a directed weighted graph for the set of batch jobs, wherein in the directed weighted graph, a node represents a batch job, a directed edge between two of the nodes represents a directed connection between two corresponding batch jobs, a weight of the node represents the execution time of the batch job corresponding to the node;

obtaining information of consumption of same resource(s) among the batch jobs in the set of batch jobs to obtain related batch jobs consuming the same resource(s) in the set of batch jobs;

optimizing the directed weighted graph based on the information of consumption of same resource(s) among the batch jobs in the set of batch jobs;

determining, by the one or more processors, whether the related batch jobs are parallel batch jobs according to the optimized directed weighted graph for the set of batch jobs, and if the related batch jobs are not parallel batch jobs and consume the same resource(s) concurrently, further optimizing the directed weighted graph to prevent concurrent consumption of the same resources;

arranging, by the one or more processors, the batch jobs into a plurality of batch job sequence arrangements;

calculating, by the one or more processors, respective total execution time of the set of batch jobs for respective batch job sequence arrangements;

selecting, by the one or more processors, a batch job sequence arrangement with a minimum total execution time of the set of batch jobs as a batch job sequence used in the further optimized directed weighted graph; and executing the processing of the batch jobs according to the batch job sequence arrangement, the executing including, for each batch job, causing one or more of the resources to be locked while the batch job is being executed to prevent other batch jobs from consuming the same resources, and then causing the resources to be released after the respective batch job is completed, wherein the information of consumption of same resources among the batch jobs in the set of batch jobs is represented as a resource consumption matrix (RCM), wherein the RCM is a n×n matrix, n is a number of batch jobs in the set, an element in an i-th row and a j-th column of the RCM indicates a situation that an i-th batch job and a j-th batch job consume resources.

12. The computer program product of claim 11, wherein optimizing the directed weighted graph comprises:

accessing respective nodes of the directed weighted graph for the set of batch jobs; and in response to determining that a plurality of parallel sub-nodes of a node in the directed weighted graph consume the same resource(s) according to the information of consumption of same resources among the batch jobs in the set of batch jobs, arranging, by the one or more processors, the plurality of parallel sub-nodes into the plurality of batch job sequence arrangements.

13. The computer program product of claim 11, wherein optimizing the directed weighted graph further comprises:

adding respective empty batch jobs with execution time to avoid resource conflict to respective part of related batch jobs for each of the plurality of batch job sequence arrangements, wherein the calculating of the respective total execution time of the set of batch jobs for respective batch job sequence arrangements is performed with the respective empty batch jobs.

14. The computer program product of claim 11, wherein in the directed weighted graph, a first pseudo node represents a root node and a second pseudo node represents an end node, and the determining whether the related batch jobs consume the same resource concurrently comprises:

determining respective execution time of respective nodes of related nodes from the root node in the directed weighted graph;

determining whether respective execution time periods of respective nodes of the related nodes have time overlap; and in response to determining that the respective execution time periods of respective nodes of the related nodes have the time overlap, determining that the related batch jobs consume the same resource concurrently.

15. The computer program product of claim 11, wherein the determining whether the related batch jobs consume the same resource concurrently further comprises:

in response to determining that respective execution time periods of respective nodes of the related nodes have no time overlap, determining that the related batch jobs do not consume the same resource concurrently.

* * * * *